(12) United States Patent
Chandrasekaran

(10) Patent No.: US 10,582,065 B2
(45) Date of Patent: Mar. 3, 2020

(54) RECHARGING PREPAID ACCOUNTS WITHIN A TELECOMMUNICATIONS NETWORK

(71) Applicant: T-Mobile USA, Inc., Bellevue, WA (US)

(72) Inventor: Karthik Chandrasekaran, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/183,653

(22) Filed: Nov. 7, 2018

(65) Prior Publication Data

US 2019/0141198 A1    May 9, 2019

Related U.S. Application Data

(60) Provisional application No. 62/582,920, filed on Nov. 7, 2017.

(51) Int. Cl.
*H04M 15/00* (2006.01)
*H04M 17/00* (2006.01)
*H04W 4/24* (2018.01)

(52) U.S. Cl.
CPC ............. *H04M 17/20* (2013.01); *H04W 4/24* (2013.01)

(58) Field of Classification Search
CPC .... H04M 17/20; H04M 15/772; H04M 17/02; H04M 17/204; H04M 17/206; H04M 17/207; H04L 12/1467; H04W 4/24
See application file for complete search history.

(56) References Cited

U.S. PATENT DOCUMENTS

| 8,359,003 | B1* | 1/2013 | Gailloux | H04M 15/08 379/114.01 |
|---|---|---|---|---|
| 2002/0035479 | A1 | 3/2002 | Takae et al. | |
| 2005/0027624 | A1* | 2/2005 | Cai | G06Q 30/04 705/32 |
| 2007/0105529 | A1* | 5/2007 | Lundstrom | H04M 15/07 455/405 |
| 2008/0293386 | A1* | 11/2008 | Noldus | H04M 15/00 455/414.1 |

(Continued)

OTHER PUBLICATIONS

StarHub, "Top up StarHub Mobile Prepaid anytime, anywhere." <http://www.starhub.com/personal/mobile/mobile-phones-plans/prepaid-cards/top-up-options/top-up-via-starhub-postpaid-line.html> 2018, 15 pages.

(Continued)

*Primary Examiner* — Pakee Fang
(74) *Attorney, Agent, or Firm* — Perkins Coie LLP

(57) ABSTRACT

Systems and methods are described herein for recharging prepaid accounts within a telecommunications provider, such as a network carrier, using information provided by postpaid account subscribers. For example, the systems and methods facilitate the receipt of instructions from mobile devices associated with postpaid accounts. Upon receipt of the messages, the systems and methods (such as systems within a charging system of the network carrier or provider) identify intended or recipient mobile devices associated with prepaid accounts. Once identified, the systems and methods recharge the prepaid accounts, based on the instructions received from the postpaid account mobile devices.

20 Claims, 5 Drawing Sheets

(56) References Cited

U.S. PATENT DOCUMENTS

| | | | |
|---|---|---|---|
| 2009/0005000 A1* | 1/2009 | Baker | G06Q 10/103 |
| | | | 455/405 |
| 2009/0005006 A1 | 1/2009 | Zhang | |
| 2009/0081989 A1 | 3/2009 | Wuhrer | |
| 2014/0038546 A1* | 2/2014 | Neal | G06Q 10/103 |
| | | | 455/405 |

OTHER PUBLICATIONS

International Searching Authority, International Search Report and Written Opinion, PCT Patent Application PCT/US2018/059697, dated Mar. 6, 2019, 13 pages.

* cited by examiner

RECHARGING PREPAID ACCOUNTS WITHIN A TELECOMMUNICATIONS NETWORK

CROSS REFERENCE TO RELATED APPLICATIONS

This application claims priority to U.S. Provisional Patent Application No. 62/582,920, filed on Nov. 7, 2017, entitled RECHARGING PREPAID ACCOUNTS WITHIN A TELECOMMUNICATIONS NETWORK, which is hereby incorporated by reference in its entirety.

BACKGROUND

Mobile electronic devices (such as smart phones, personal digital assistants, computer tablets, and so on) are ubiquitous. Mobile devices provide advanced computing capabilities and services to users, such as voice communications, text and other messaging communications, video and other multimedia communications, streaming services, and so on. Often, users, via their mobile devices, access such services as customers or subscribers of telecommunications carriers, which provide telecommunications networks within which the users make voice calls, send text messages, send and receive data, and so on.

The telecommunications carriers can provide their customers and subscribers with various plans of service. For example, the carriers can offer and provide contractual subscription plans, where a customer is locked into an ongoing plan for a certain duration of time. As another example, the carriers can offer and provide prepaid, or non-contractual, plans, where a customer determines, during or after each segment of the plan, whether to renew and continue with the plan.

Currently, there are many carriers offering potential and current customers a variety of different varieties of both the contractual and prepaid plans of service. For example, one carrier can offer a low cost, prepaid plan, where a customer receives a basic menu of services (e.g., unlimited voice and text communications, and 1 gigabyte of data per month), as well as a higher level, and higher cost, plan, where a customer receives an enhanced or greater menu of services (e.g., unlimited voice and text communications, and 4 gigabytes of data per month), while other carriers offer similar plans and services.

The prepaid accounts, as they are limited both in services and access, can be cumbersome to manage and/or utilize, especially when their associated users are unable to update or recharge the accounts per usual mechanisms (e.g., online recharging interfaces are unavailable to the users). These and other problems exist with respect to providing prepaid accounts to customers of a network.

BRIEF DESCRIPTION OF THE DRAWINGS

Embodiments of the present technology will be described and explained through the use of the accompanying drawings.

Figure 1:
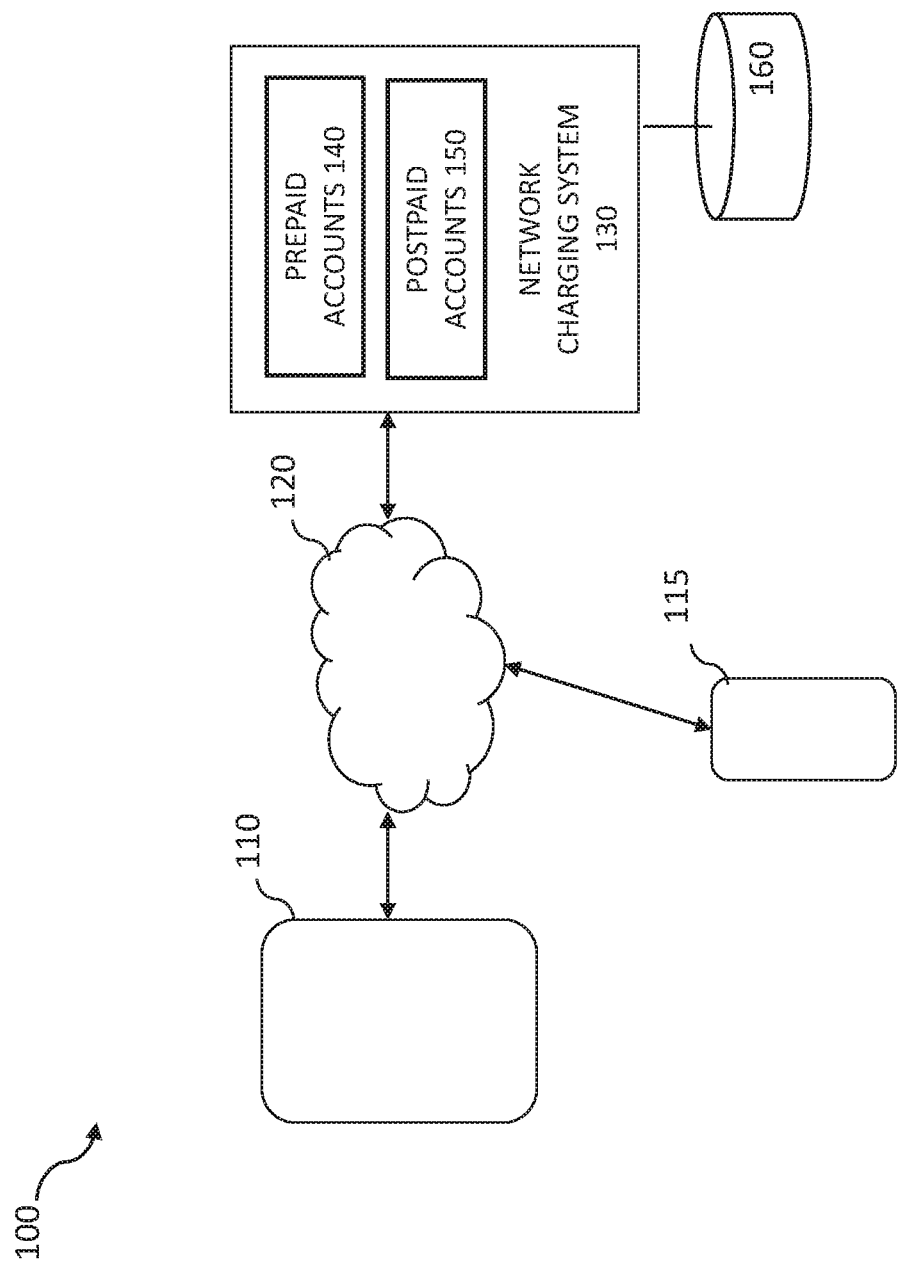
FIG. 1 is a block diagram illustrating a suitable computing environment within which to recharge prepaid telecommunications accounts via postpaid subscriber accounts.

The drawings have not necessarily been drawn to scale. Similarly, some components and/or operations can be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Systems and methods are described herein for recharging prepaid accounts within a telecommunications provider, such as a network carrier, using information provided by postpaid account subscribers. For example, the systems and methods facilitate the receipt of instructions from mobile devices associated with postpaid accounts, such as the receipt of USSD (Unstructured Supplementary Service Data) messages and SMS (short message service) messages containing short codes or other instructions.

Upon receipt of the messages, the systems and methods (such as systems within a charging system of the network carrier or provider) identify intended or recipient mobile devices associated with prepaid accounts. Once identified, the systems and methods recharge the prepaid accounts, based on the instructions received from the postpaid account mobile devices. For example, a charging system can request payment from a postpaid account charging system provided by the network carrier.

The systems and method can employ various network-specific components when facilitating the recharging of subscriber accounts. For example, upon receipt of a message from a mobile device, a charging system receives a request from one or more core network components (e.g. a Mobile Switching Server (MSS) for a 3G network or a Telephony Application Server (TAS) for an LTE network). The charging system then modifies an identified prepaid account and instructs a network billing system to bill a postpaid account accordingly.

Thus, the systems and methods facilitate timely, simple, accessible, and efficient recharging of prepaid accounts for subscribers that are in a different country, unable to access funds, or otherwise unavailable to recharging their prepaid account online and utilize their mobile device, among other benefits.

In the following description, for the purposes of explanation, numerous specific details are set forth in order to provide a thorough understanding of embodiments of the present technology. It will be apparent, however, to one skilled in the art that embodiments of the present technology can be practiced without some of these specific details.

Examples of Suitable Computing Environments

As described herein, in some embodiments, the systems and methods provide network-based processes that enable postpaid account subscribers to facilitate the recharging of mobile devices associated with prepaid accounts. FIG. 1 is a block diagram illustrating a suitable computing environment 100 within which to recharge prepaid telecommunications accounts via postpaid subscriber accounts.

A user (e.g., customer or subscriber) uses his/her prepaid mobile device 110 (such as a mobile or smart phone, tablet computer) to access various services (e.g., voice, message, and/or data services) supported by a telecommunications network 120 that is provided by a telecommunications (wireless) carrier.

In some embodiments, the mobile device 110 can include network communication components that enable the mobile device to communicate with remote servers or other portable electronic devices by transmitting and receiving wireless signals using a licensed, semi-licensed, or unlicensed spectrum over communications network, such as network 120. In some cases, the communications network 120 can be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. The communications network 120 can also include third-party communications networks such as a Global System for Mobile (GSM) mobile communications network, a code/time division multiple access (CDMA/TDMA) mobile communications network, a 3rd (3G), 4th (4G), or 5th generation (5G) mobile communications network (e.g., General Packet Radio Service (GPRS/EGPRS), Enhanced Data rates for GSM Evolution (EDGE), Universal Mobile Telecommunications System (UMTS), or Long Term Evolution (LTE) network)), or other communications network.

Those skilled in the art will appreciate that various other components can be included in the mobile device 110 to enable network communication. For example, the mobile device 110 can be configured to communicate over a GSM or newer mobile telecommunications network. As a result, the mobile device 110 can include a Subscriber Identity Module (SIM) card that stores an International Mobile Subscriber Identity (IMSI) number that is used to identify the mobile device 110 on the GSM mobile or other communications networks, for example, those employing 3G, 4G, and/or 5G wireless protocols. If the mobile device 110 is configured to communicate over another communications network, the mobile device 110 can include other components that enable it to be identified on the other communications networks.

In some embodiments, the mobile device 110 can include components that enable the device to connect to a communications network, such as network 120, using Generic Access Network (GAN), Unlicensed Mobile Access (UMA), or LTE-U standards and protocols. For example, the mobile device 110 can include components that support Internet Protocol (IP)-based communication over a Wireless Local Area Network (WLAN) and components that enable communication with the telecommunications network over the IP-based WLAN. Further, while not shown, the mobile device 110 can include capabilities for permitting communications with satellites. The mobile device 110 can include one or more mobile applications that transfer data or check-in with remote servers and other networked components and devices.

Among other network components, the carrier maintains one or more charging systems 130 (e.g., implemented via network servers) and one or more associated databases 160 that perform actions to provide prepaid accounts, postpaid accounts, and other service plans to customers, and store information associated with their customers, the service plans they provide, associated accounting and payment systems, and so on.

For example, the charging system 130 can include a prepaid account data system 140 and a postpaid account data system 150 that include components to create, update, and store information associated new customers of service plans provided by the carrier, current customers of service plans provided by the carrier, previous or churned customers of service plans provided by the carrier, and so on.

The systems 140 and 150 can interact with one another when identifying and/or recharging devices associated with prepaid account subscribers. For example, the charging system server 130 can receive a message from a mobile device 115 associated with a postpaid subscriber and extract a short code (e.g., a charging code), that identifies a prepaid account mobile device (e.g., device 110) and authorizes recharging of the mobile device using the postpaid account of the mobile device 115. The charging system server 130 can then cause the prepaid account data system 140 to recharge the mobile device 110 and bill the postpaid account of the mobile device 115 via the postpaid account data system 150. Further details regarding the recharging of accounts and the network components configured to facilitate the recharging of accounts are described herein.

FIG. 1 and the discussion herein provide a brief, general description of a suitable computing environment 100 in which the system can be supported and implemented. Although not required, aspects of the system described in the general context of computer-executable instructions, such as routines executed by a general-purpose computer, e.g., mobile device, a server computer, or personal computer. Those skilled in the relevant art will appreciate that the system can be practiced with other communications, data processing, or computer system configurations, including: Internet appliances, hand-held devices (including tablet computers and/or personal digital assistants (PDAs)), all manner of cellular or mobile phones, multi-processor systems, microprocessor-based or programmable consumer electronics, set-top boxes, network PCs, mini-computers, mainframe computers, and the like. Indeed, the terms "computer," "host," and "host computer," and "mobile device" and "handset" are generally used interchangeably herein and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system can also be practiced in distributed computing environments where tasks or modules are performed by remote processing devices, which are linked through a communications network, such as a Local Area Network (LAN), Wide Area Network (WAN), or the Internet. In a distributed computing environment, program modules can be located in both local and remote memory storage devices.

Aspects of the system can be stored or distributed on computer-readable media (e.g., physical and/or tangible computer-readable storage media), including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the system can be distributed over the Internet or over other networks (including wireless networks), on a propagated signal on a propagation medium (e.g., an electromagnetic wave(s), a sound wave, etc.) over a period of time, or they can be provided on any analog or digital network (packet switched, circuit switched, or other scheme). Those skilled in the relevant art will recognize that portions of the system reside on a server computer, while corresponding portions reside on a client computer such as a mobile or portable device, and thus, while certain hardware platforms are described herein, aspects of the system are equally applicable to nodes on a network. In an alternative embodiment, the mobile device or portable device can represent the server portion, while the server can represent the client portion.

Examples of Recharging Prepaid Accounts Using Network-Based Components

As described herein, in some embodiments, the systems and methods authorize and/or facilitate the recharging of prepaid accounts using funds provided by postpaid accounts supported by a network provider. The network provider utilizes certain network components to manage recharging requests and coordinate the provisioning of credits or other updates to customer accounts, such as prepaid customer accounts.

Figure 2:
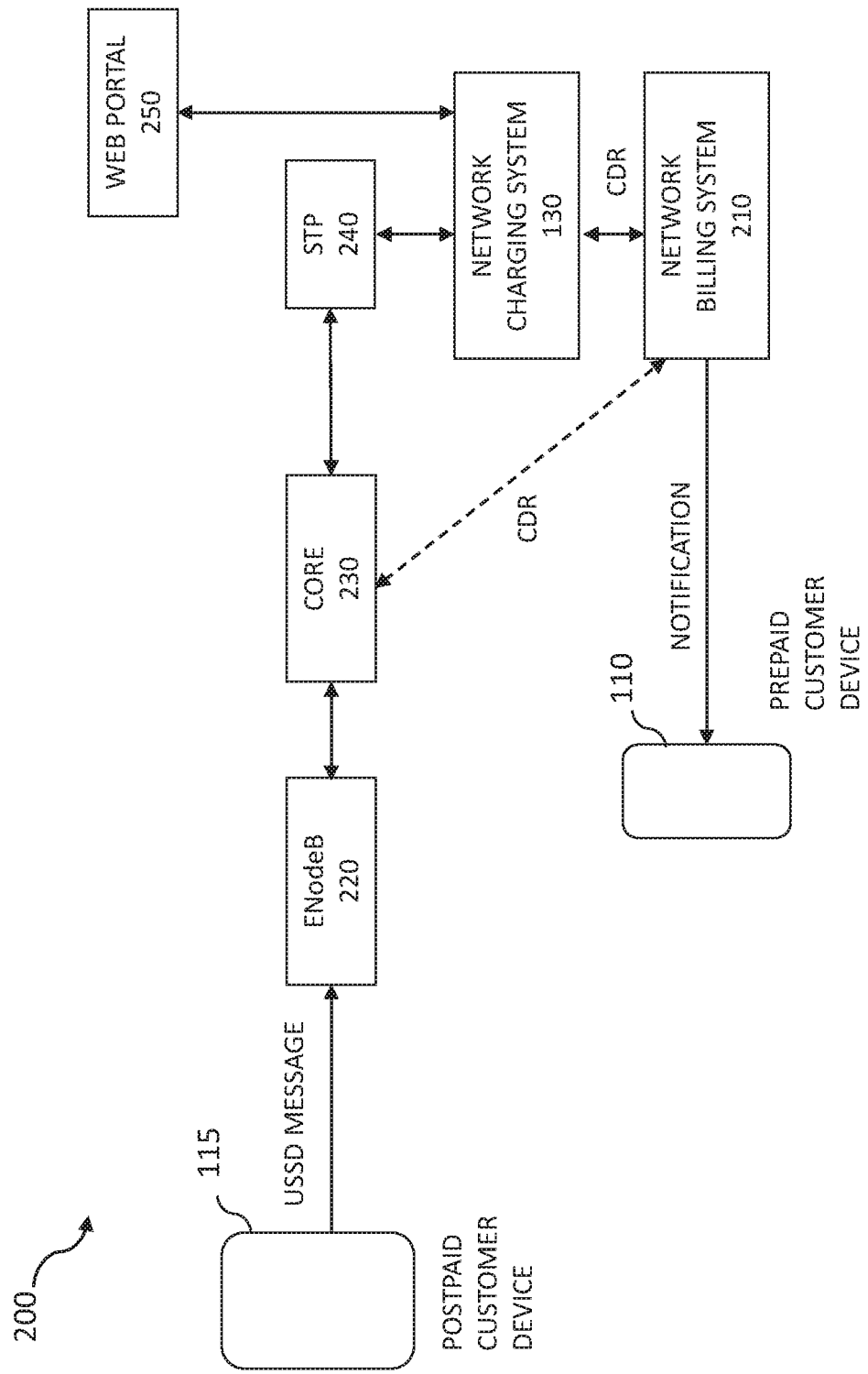
FIG. 2 is a block diagram illustrating various network components configured to recharge prepaid accounts.

FIG. 2 depicts various network components 200 configured to manage communications between components of the network 120 when recharging prepaid customer accounts based on information or instructions provided by devices associated with postpaid accounts.

For example, the mobile device 110 associated with a prepaid customer has run out of data (or minutes, or text messages, or some other bucket of credits), and cannot perform a transaction to recharge online. A postpaid customer, possibly a friend or co-worker of the prepaid customer, offers to utilize the systems and methods described herein, and facilitate recharging of the prepaid customer's account using his/her postpaid account.

The postpaid customer, via the associated mobile device 115, sends a USSD message (or other similar message or short code) to the network 120. The message includes information identifying the other mobile device 110, such as an MSISDN (Mobile Station International Subscriber Directory Number) for the mobile device 110 (in an eleven-digit format), or other identifiers (e.g., IMSI or SIM information, network identifiers, usernames, and so on). Further, the message can include an amount to recharge (identified as amount of currency, credits, data, and so on), and/or information identifying the postpaid account at which to bill for the recharging of the prepaid account.

The USSD message is received by the network at an Evolved Node B (eNodeB) component 220, such as a next generation eNodeB (ng-eNB) within 5G networks. The eNodeB 220 (or other similar component) then transfers the USSD message to one or more networks servers or components associated with a core network 230 of the network 120. For example, one or more core network components (e.g. a Mobile Switching Server (MSS) of a 3G network or a Telephony Application Server (TAS) for an LTE network), configured to perform call and message control and handling operations, process the USSD message and trigger a recharging request. The recharging request includes, for example, the information provided within the USSD message. The request is then sent to the charging system 130 via a signal transfer point component, or STP 240.

The charging system 130, as described herein, updates or otherwise credits an account for the prepaid customer (e.g., an account managed by the prepaid accounts system 140) at the charging system 130. For example, the charging system 130 updates the account associated with the mobile device 110 by adding an amount ($Y) indicated in the USSD message (and, thus, authorized by the postpaid customer associated with mobile device 115). In some cases, the charging system 130 updates the prepaid account with additional data buckets, message buckets, credits, currency, tokens, or other units that facilitate additional use of the network 120.

Once the charging system 130 updates or otherwise modifies the prepaid account, the system 130 (or other network components) notifies (e.g., via transmission of charging data records (CDRs)) a network billing system 210, which performs various billing-related processes associated with the update (and based on the records). For example, the network billing system 210 can bill or otherwise debit an account associated with the postpaid subscriber (e.g., by updating data stored in the postpaid account system 150).

In some embodiments, the billing system 210 then sends notifications to one or both of the mobile devices 110, 115. For example, the billing system 210 sends a notification to the mobile device 110 (associated with the prepaid subscriber) indicating that his friend has recharged his account, and/or sends a notification to the mobile device 115 (associated with the postpaid subscriber) indicating his/her account has been billed for the recharging of the other device. Of course, the billing system 210 (or other systems depicted in FIG. 2) can send various notifications to the mobile devices 110, 115 that indicate certain information for the recharging of the prepaid account.

In some embodiments, the postpaid subscriber can utilize other mechanisms for providing input to the network 120 to recharge the mobile device 110 of the prepaid subscriber. For example, the postpaid subscriber can utilize a web portal (or other online service) 250, which sends, via an HTTPS connection, information identifying the mobile device 110 and recharging amounts (e.g., $Y) directly to the charging system 130. The postpaid customer via the web portal, can access his/her account, and authorize recharging of another device. Thus, the systems and methods, in some embodiments, configure the network to facilitate the reception of information associated with recharging of prepaid accounts from a variety of different entry points.

Figure 3:
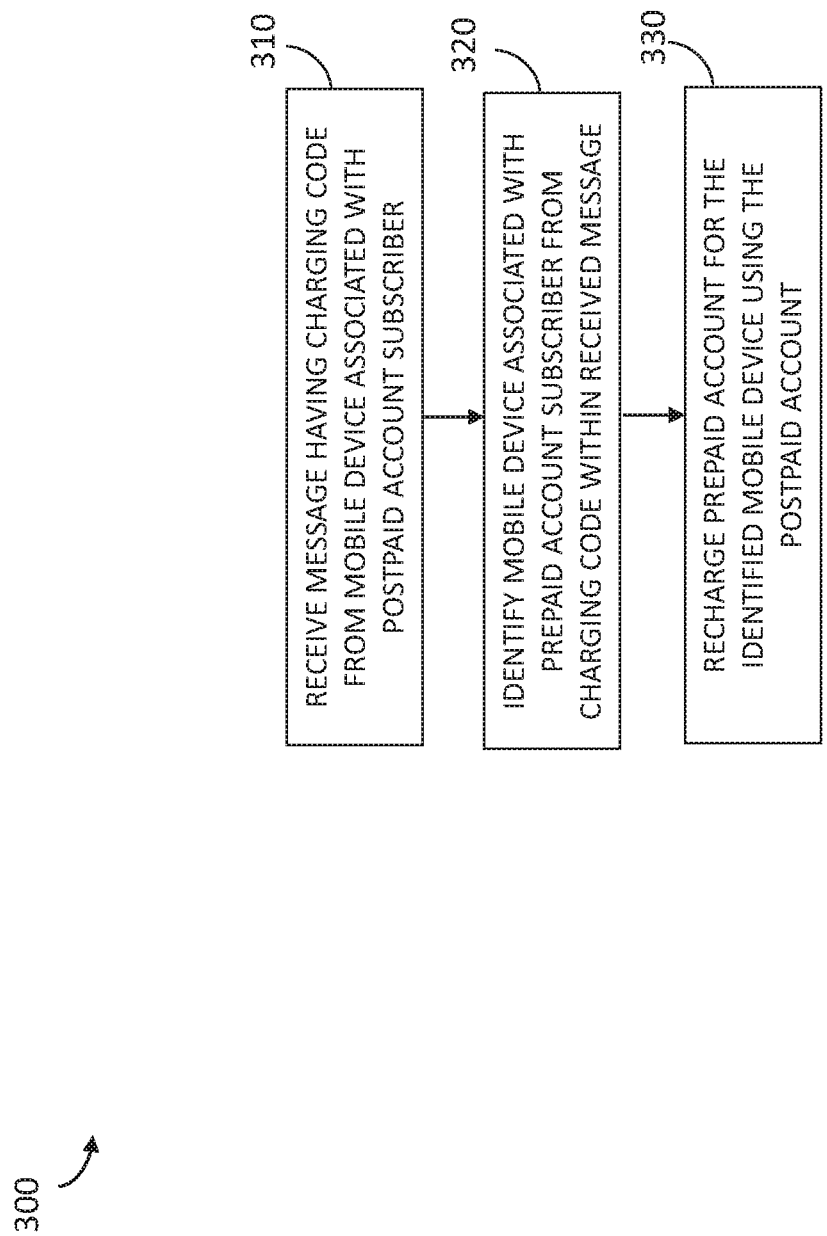
FIG. 3 is a flow diagram illustrating a method for recharging a prepaid account.

Thus, as described herein, the systems and method perform a variety of network-based processes when recharging customer accounts, such as prepaid subscriber accounts for the network 120. FIG. 3 is a flow diagram illustrating a method 300 for recharging a prepaid account. The method 300 can be performed by the charging system 130, and, accordingly, is described herein merely by way of reference thereto. It will be appreciated that the method 300 can be performed on any suitable hardware.

In operation 310, the system 130 receives a message from a mobile device associated with a subscriber of a postpaid account for telecommunications services provided by the telecommunications service provider. The message can include a charging code that identifies a mobile device associated with a subscriber of a prepaid account for telecommunications services provided by the network. The message can be a USSD message, SMS, instant message, chat message, and so on. The charging code can include information identifying a recharging amount (e.g., a certain value, number of months, and so on), information identifying a recipient mobile device (e.g., various identifying information, such as MSISDN or IMSI), and so on.

In operation 320, the system 130 identifies, within the charging system 130 of the telecommunications service provider or network, the mobile device associated with the subscriber of the prepaid account based on the charging code. For example, the system 130 can query the database 160 to identify the device 110 to be recharged, using the identification information.

In operation 330, the system 130 recharges, utilizing data stored in the account systems 140, 150 of the telecommunications service provider, the prepaid account using credit or currency provided by the postpaid account associated with the mobile device 115 from which the message was received by the charging system 130. For example, the system 130 recharges mobile device 110, and bills the amount (via the billing system 210) to recharge the device 110 to the postpaid account associated with the mobile device 115.

Figure 4:
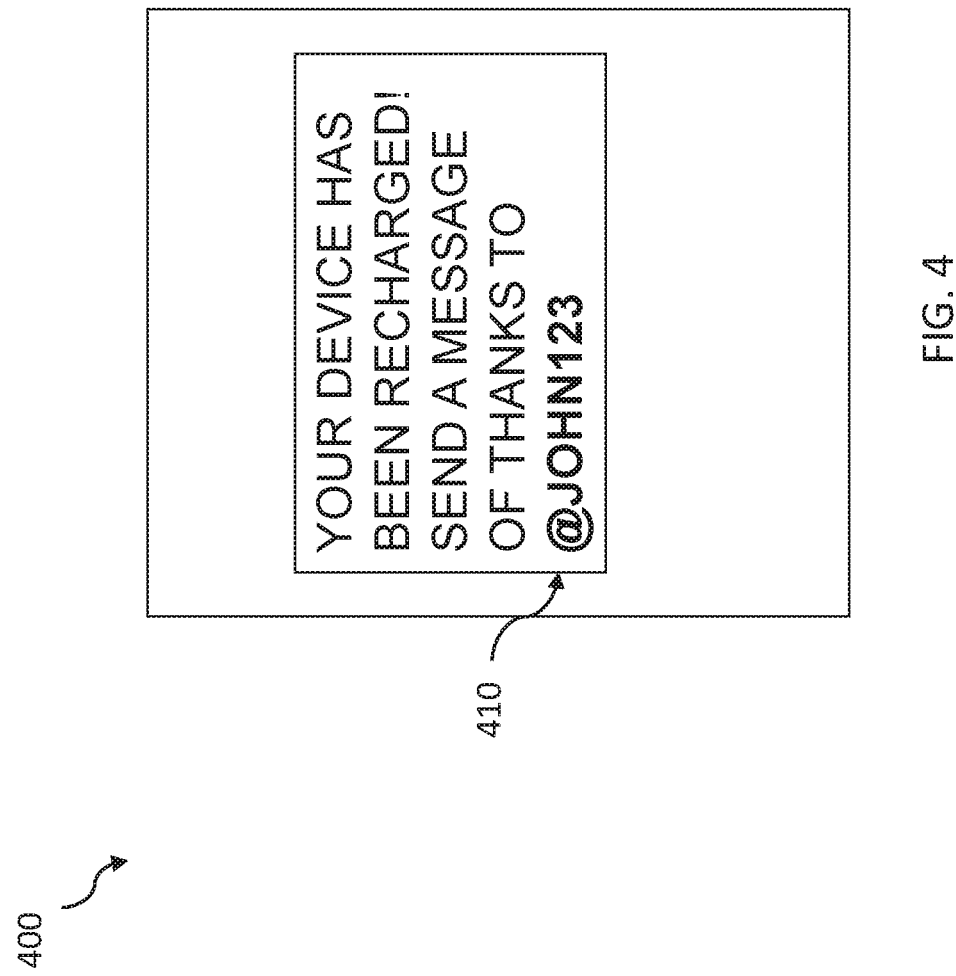
FIG. 4 is a display diagram illustrating an example user interface presented to a user of a prepaid account.

Once recharging is complete, the system 130 can inform the mobile device 110 in a variety of ways. For example, the system 130 can send a message to the device, as depicted in FIG. 4. As shown in FIG. 4, a user interface 400 of the mobile device 110 can present a message 410 that indicates a postpaid account user (e.g., "JOHN123") has facilitated the recharging of the prepaid account. Of course, other messages or content can be displayed by the device 110.

Thus, as described herein, the systems and methods enable the charging system 130 of a network carrier to facilitate collaboration between postpaid account systems 150 and prepaid account systems 140 within the charging system 130. The charging system 130, therefore, can include a message reception component that receives messages from mobile devices associated with postpaid accounts provided by the network carrier, and a cross-account recharging component that recharges mobile devices associated with prepaid accounts provided by the network carrier based on receiving the messages from the postpaid accounts provided by the network carrier.

Figure 5:
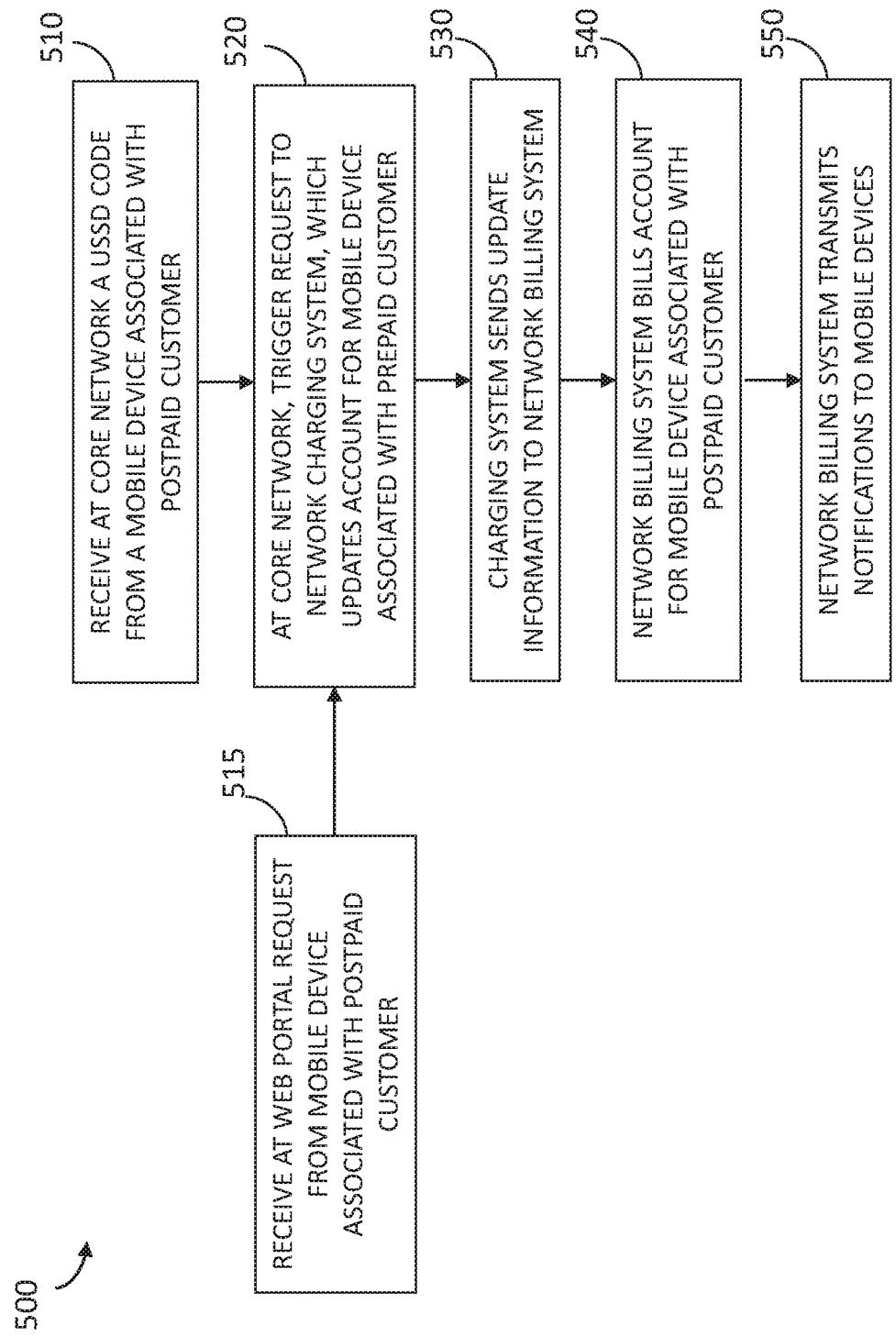
FIG. 5 is a flow diagram illustrating a method of processing a recharging request within a telecommunications network.

As described herein, the network 120 provided by the service provider can specifically employ certain network components to perform various processes associated with recharging prepaid accounts for subscribers or customers of the network 120. FIG. 5 is a flow diagram illustrating a method 500 of processing a recharging request within a telecommunications network. The method 500 can be performed by the network 120, and, accordingly, is described herein merely by way of reference thereto. It will be appreciated that the method 500 can be performed on any suitable hardware.

In operation 510, the network 120 receives a USSD message (or other message) from a mobile device associated with a postpaid account. For example, a TAS of the core network 230 receives, from the eNodeB 220 providing access to the mobile device 115, a USSD message from the device 115. The USSD message can include information identifying a mobile device or prepaid subscriber account to be recharged (e.g., an MSISDN for the mobile device 110), as well as information indicating an amount to recharge the prepaid account (e.g., $Y, a certain number of credits or data buckets (e.g., 2 GBs), and so on), and other information for the postpaid account customer (account identifiers, device identifiers, and so on).

In some cases, the network 120 receives a recharging request via other interfaces or portals. For example, in operation 515, the network 120 receives input via a web portal or other online service (e.g., plug-in, application, and so on) that identifies the postpaid customer, the prepaid account to be recharged, and/or the recharge amount or cost).

In operation 520, the network 120 triggers or otherwise generates a request to send to the charging system 130. The request is based on the information provided in the USSD message and configured to cause the charging system 130 to recharge the prepaid subscribers account. For example, the core network 230 sends, via the STP 240, the request to the charging system 130, which accesses the prepaid account (via the prepaid accounts system 140) and recharges the account accordingly (e.g., authorizes an additional month or services, adds additional data or message buckets, and so on).

In operation 530, the network 120 sends information (e.g., charge data records) to the network billing system 210. For example, the charging system 130, after recharging the prepaid account associated with the mobile device 110, generates charging data records for the recharging event, and sends the CDRs to the billing system 210.

In operation 540, the network 120 bill the postpaid account for the recharging of the prepaid account. For example, the billing system 210 debits or otherwise bills the postpaid account associated with the mobile device 115 for an amount that is recharged to the prepaid account associated with the mobile device 110. The billing system 210, for example, bills an amount (e.g., $Y) for the recharging, a data bucket (e.g., transfers 3 GBs within a service plan from the postpaid account to the prepaid account), and so on.

In operation 550, the network 120 sends notifications to the mobile devices based on the recharging event. For example, as depicted in FIG. 4, the network billing system 210 (or recharging system 130) displays an indication to the mobile device 110 that an associated prepaid account has been recharged using funds provided by a customer associated with a postpaid account. As another example, the billing system 210 sends a notification to the mobile device 115 associated with the postpaid subscriber, such as displayed information that identified the recharging event and/or an amount to be billed to the postpaid subscriber account.

Thus, as described herein, the systems and methods utilize certain network components (e.g., core network 230 components, charging system 130, and so on) when managing, processing, or controlling account recharging requests received by the network 120.

For example, messages are received via the core network 230 (e.g., via an open TAS for an LTE or VoLTE network or 5G network), routed via the STP 240, and received at the charging system 130. The charging system 130 receives the relevant information and recharges the prepaid accounts identified in the messages, then prompting the billing system 210 to bill the postpaid accounts that sent the recharging messages to the network 120.

Thus, in some embodiments, the network 120 facilitates use of the charging system 130 (and/or other network components) to receive a request from one device (e.g., device 115) and perform an action (e.g., recharge an account) for another device (e.g., device 110). The systems and methods, therefore, can unite various disparate systems within the charging system 130, providing additional benefits to subscribers of various different service plans and accounts, among other benefits.

Further, the systems and methods facilitate solving issues specific to providing network services (e.g., messaging, data, voice, and so on) to mobile devices. By configuring certain network components (e.g., core network components, charging systems, and so on) to perform message handling and recharging request generation, a telecommunications network gains an enhanced ability to maintain and keep its subscribers when the subscribers are unable to access the network to update their account or otherwise continue using service provided by the network, among other benefits.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number can also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or subcombinations. Each of these processes or blocks can be implemented in a variety of different ways. Also, while processes or blocks are at times shown as being performed in series, these processes or blocks can instead be performed or implemented in parallel, or can be performed at different times. Further any specific numbers noted herein are only examples: alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology can include not only additional elements to those implementations noted above, but also can include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system can vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects can likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A non-transitory computer-readable medium whose contents, when executed by a network server associated with a telecommunications network, causes the network server to perform a method for providing telecommunications services to a mobile device over the telecommunications network, where the mobile device is associated with a prepaid subscriber of a service provider for the telecommunications network, the method comprising:
   receiving, via an evolved node B of the telecommunications network, a message from a first mobile device that is associated with a postpaid subscriber of the telecommunications network,
      wherein the message includes contents that identify a second mobile device associated with a prepaid subscriber of the telecommunications network, an identifier for the postpaid subscriber of the telecommunications network, and information that identifies an amount to recharge a prepaid account for the prepaid subscriber of the telecommunications network;
   transferring the received message from the evolved node B of the telecommunications network to a core network component of the telecommunications network;
   at the core network component of the telecommunications network, generating a request to recharge the prepaid account for the prepaid subscriber of the telecommunications network,
      wherein the generated request is based on the contents of the message received from the first mobile device; and
   at a charging system of the telecommunications network, recharging the prepaid account for the prepaid subscriber of the telecommunications network in response to receiving the request from the core network component.

2. The non-transitory computer-readable medium of claim 1, further comprising:
   sending, from the charging system to a billing system of the telecommunications network, one or more charging detail records that indicates the recharging of the prepaid account for the prepaid subscriber of the telecommunications network;
   at the billing system, debiting a postpaid account for the postpaid subscriber of the telecommunications network in response to the recharging of the prepaid account for the prepaid subscriber of the telecommunications network; and transmitting a notification from the billing system to the second mobile device that identifies the prepaid account associated with the prepaid subscriber has been recharged in response to the message received from the first mobile device associated with the postpaid subscriber of the telecommunications network.

3. The non-transitory computer-readable medium of claim 1, further comprising:
sending, from the charging system to a billing system of the telecommunications network, one or more charging detail records that indicates the recharging of the prepaid account for the prepaid subscriber of the telecommunications network; and
at the billing system, debiting a postpaid account for the postpaid subscriber of the telecommunications network in response to the recharging of the prepaid account for the prepaid subscriber of the telecommunications network.

4. The non-transitory computer-readable medium of claim 1, wherein the telecommunications network is a Long-Term Evolution (LTE) network.

5. The non-transitory computer-readable medium of claim 1, wherein the telecommunications network is a 5$^{th}$ Generation (5G) network.

6. The non-transitory computer-readable medium of claim 1, wherein the message is received from the first mobile device over an Unstructured Supplementary Service Data (USSD) channel provided by the telecommunications network.

7. The non-transitory computer-readable medium of claim 1, wherein the message is received from the first mobile device via a Short Message Service (SMS) protocol provided by the telecommunications network.

8. The non-transitory computer-readable medium of claim 1, wherein the message received from the first mobile device includes information that identifies an amount of currency to recharge the prepaid account for the prepaid subscriber of the telecommunications network.

9. The non-transitory computer-readable medium of claim 1, wherein the message received from the first mobile device includes information that identifies an amount of a data bucket to recharge the prepaid account for the prepaid subscriber of the telecommunications network.

10. The non-transitory computer-readable medium of claim 1, wherein the telecommunications network is a Telephony Application Server (TAS) configured to perform message control and handling operations for the telecommunications network.

11. The non-transitory computer-readable medium of claim 1, wherein the message is received from the first mobile device via a mobile application of the first mobile device associated with the service provider that provides the telecommunications network.

12. The non-transitory computer-readable medium of claim 1, further comprising:
a signal transfer point component that routes the request generated by the core network component to the charging system of the telecommunications network.

13. A method for providing telecommunications services to a mobile device over a telecommunications network, where the mobile device is associated with a prepaid subscriber of a service provider for the telecommunications network, the method comprising:
receiving, via an evolved node B of the telecommunications network, a message from a first mobile device that is associated with a postpaid subscriber of the telecommunications network,
wherein the message includes contents that identify a second mobile device associated with a prepaid subscriber of the telecommunications network, an identifier for the postpaid subscriber of the telecommunications network, and information that identifies an amount to recharge a prepaid account for the prepaid subscriber of the telecommunications network;
transferring the received message from the evolved node B of the telecommunications network to a core network component of the telecommunications network;
at the core network component of the telecommunications network, generating a request to recharge the prepaid account for the prepaid subscriber of the telecommunications network,
wherein the generated request is based on the contents of the message received from the first mobile device; and
at a charging system of the telecommunications network, recharging the prepaid account for the prepaid subscriber of the telecommunications network in response to receiving the request from the core network component.

14. The method of claim 13, further comprising:
sending, from the charging system to a billing system of the telecommunications network, one or more charging detail records that indicates the recharging of the prepaid account for the prepaid subscriber of the telecommunications network;
at the billing system, debiting a postpaid account for the postpaid subscriber of the telecommunications network in response to the recharging of the prepaid account for the prepaid subscriber of the telecommunications network; and
transmitting a notification from the billing system to the second mobile device that identifies the prepaid account associated with the prepaid subscriber has been recharged in response to the message received from the first mobile device associated with the postpaid subscriber of the telecommunications network.

15. The method of claim 13, further comprising:
sending, from the charging system to a billing system of the telecommunications network, one or more charging detail records that indicates the recharging of the prepaid account for the prepaid subscriber of the telecommunications network; and
at the billing system, debiting a postpaid account for the postpaid subscriber of the telecommunications network in response to the recharging of the prepaid account for the prepaid subscriber of the telecommunications network.

16. The method of claim 13, wherein the telecommunications network is a Long-Term Evolution (LTE) network or a 5th Generation (5G) network.

17. The method of claim 13, wherein the message is received from the first mobile device over an Unstructured Supplementary Service Data (USSD) channel provided by the telecommunications network.

18. The method of claim 13, wherein the message is received from the first mobile device via a Short Message Service (SMS) protocol provided by the telecommunications network.

19. The method of claim 13, wherein the message received from the first mobile device includes information that identifies an amount of currency to recharge the prepaid account for the prepaid subscriber of the telecommunications network.

20. The method of claim 13, wherein the message received from the first mobile device includes information that identifies an amount of a data bucket to recharge the prepaid account for the prepaid subscriber of the telecommunications network.

\* \* \* \* \*